United States Patent
Matsuda et al.

(10) Patent No.: US 6,528,562 B2
(45) Date of Patent: Mar. 4, 2003

(54) CURABLE FLUOROPOLYETHER RUBBER COMPOSITIONS

(75) Inventors: Takashi Matsuda, Usui-gun (JP); Shinichi Sato, Usui-gun (JP); Noriyuki Koike, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/901,108

(22) Filed: Jul. 10, 2001

(65) Prior Publication Data

US 2002/0022685 A1 Feb. 21, 2002

(30) Foreign Application Priority Data

Jul. 10, 2000 (JP) ........................................ 2000-208633

(51) Int. Cl.7 .............................. C08K 5/18; C08K 5/13
(52) U.S. Cl. ....................... 524/236; 524/252; 524/255; 524/258; 524/323; 524/333; 524/345; 524/349; 528/15; 528/25; 528/31; 528/42; 528/402
(58) Field of Search .............................. 528/15, 25, 31, 528/42, 402; 524/252, 254, 255, 258, 323, 333, 345, 349

(56) References Cited

U.S. PATENT DOCUMENTS 4,174,461 A * 11/1979 Sianesi et al. ............... 568/582
4,681,693 A * 7/1987 Gavezotti et al. ...... 428/694 TF
5,475,078 A * 12/1995 Sato et al. ..................... 528/16
5,705,668 A * 1/1998 Odello et al. ................. 558/75
5,837,774 A   11/1998 Kenichi et al.
6,083,600 A * 7/2000 Kasai et al. ............... 428/65.4

FOREIGN PATENT DOCUMENTS

| EP | 0725113 A |   | 8/1996 |   |
|----|-----------|---|--------|---|
| JP | 09102118 A | * | 4/1997 | ............ G11B/5/72 |
| JP | 2990646   |   | 10/1999 |   |

OTHER PUBLICATIONS

Abstract of 08199070.

* cited by examiner

Primary Examiner—Robert Dawson
Assistant Examiner—Marc Zimmer
(74) Attorney, Agent, or Firm—Millen, White, Zelano & Branigan, P.C.

(57) ABSTRACT

A fluoropolyether rubber composition comprising (A) a linear fluoropolyether compound containing at least two alkenyl groups and having a perfluoroalkyl ether structure in its backbone, (B) an organosilicon compound having at least two silicon atom-bound hydrogen atoms which all form H—Si($C_aH_{2a}$)Si structures wherein "a" is 1, 2 or 3, (C) a hydrosilylation catalyst, and (D) an antidegradant, typically an aromatic secondary amine compound is curable into products having heat resistance, chemical resistance, solvent resistance, parting property, water repellency, oil repellency, and weather resistance as well as resistance to acid, alkali and oxidative degradation.

15 Claims, No Drawings

CURABLE FLUOROPOLYETHER RUBBER COMPOSITIONS

This invention relates to a curable fluoropolyether rubber composition which cures into products having heat resistance, chemical resistance, solvent resistance, parting property, water repellency, oil repellency, and weather resistance as well as resistance to acid, alkali and oxidative degradation.

BACKGROUND OF THE INVENTION

Japanese Patent No. 2,990,646 discloses a composition comprising a linear fluoropolyether compound containing at least two alkenyl groups per molecule and having a perfluoropolyether structure in its backbone, an organosilicon compound having at least two H—SiOSi structures per molecule, and a hydrosilylation catalyst. This composition cures into products having a good profile of heat resistance, chemical resistance, solvent resistance, parting property, water repellency, oil repellency, and weather resistance.

Although such fluoropolyether rubber compositions exhibit satisfactory performance in most applications, more acid resistance is required in semiconductor and engine oil-related applications.

SUMMARY OF THE INVENTION

An object of the invention is to provide a curable fluoropolyether rubber composition which cures into products having heat resistance, chemical resistance, solvent resistance, parting property, water repellency, oil repellency, and weather resistance as well as resistance to acid, alkali and oxidative degradation.

We have found that a fluoropolyether rubber composition obtained by blending (A) a linear fluoropolyether compound containing at least two alkenyl groups and having a perfluoroalkyl ether structure in its backbone, (B) an organosilicon compound having at least two silicon atom-bound hydrogen atoms which all form H—Si($C_aH_{2a}$)Si structures, (C) a hydrosilylation catalyst, and (D) an antidegradant is curable into products having heat resistance, chemical resistance, solvent resistance, parting property, water repellency, oil repellency, and weather resistance as well as resistance to acid, alkali and oxidative degradation.

The invention provides a curable fluoropolyether rubber composition comprising (A) a linear fluoropolyether compound containing at least two alkenyl groups in a molecule and having a perfluoroalkyl ether structure in its backbone, (B) an organosilicon compound having at least two hydrogen atoms each bound to a silicon atom in a molecule, all the silicon atom-bound hydrogen atoms constituting a H—Si($C_aH_{2a}$)Si structure wherein "a" is an integer of 1 to 3, (C) a hydrosilylation catalyst, and (D) an antidegradant.

DESCRIPTION OF THE PREFERRED EMBODIMENTS

The respective components of the curable fluoropolyether rubber composition are described below.

The linear fluoropolyether compound (A) used herein is one containing at least two alkenyl groups in a molecule and having a divalent perfluoroalkyl ether structure in its backbone.

The perfluoroalkyl ether structure is a structure containing a plurality of recurring units of the formula: —$C_dF_{2d}$O— wherein d is independently on each occurrence an integer of 1 to 6. Typical structure has the following general formula (5):

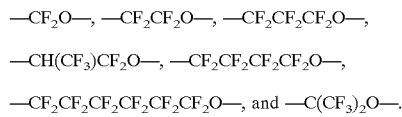

wherein q is an integer of 1 to 500, preferably 2 to 400, more preferably 10 to 200.

Examples of the recurring units of formula (5) are shown below.

—$CF_2$O—, —$CF_2CF_2$O—, —$CF_2CF_2CF_2$O—,

—$CH(CF_3)CF_2$O—, —$CF_2CF_2CF_2CF_2$O—,

—$CF_2CF_2CF_2CF_2CF_2CF_2$O—, and —$C(CF_3)_2$O—.

Of these, —$CF_2$O—, —$CF_2CF_2$O—, —$CF_2CF_2CF_2$O—, and —$CH(CF_3)CF_2$O— are preferred. It is understood that the perfluoroalkyl ether structure may consist of recurring units of one type or recurring units of two or more types.

The alkenyl groups in the linear fluoropolyether compound are those of 2 to 8 carbon atoms, especially 2 to 6 carbon atoms, having a $CH_2$=CH— structure at an end such as vinyl, allyl, propenyl, isopropenyl, butenyl and hexenyl, with the vinyl and allyl being especially preferred. The alkenyl groups may be present within the molecule, although they are preferably attached to both ends of the molecular chain. In the preferred case, the alkenyl groups may be attached either directly to both ends of the backbone of the linear fluoropolyether compound or to the backbone through a divalent linking group such as —$CH_2$—, —$CH_2$O— or —Y—NR'—CO—.

Herein Y is —$CH_2$— or a group of the following structural formula (I):

(the bond may be at o, m or p-position) and R' is hydrogen, methyl, phenyl or allyl.

Preferred linear fluoropolyether compounds (A) are those of the following general formula (1) or (2).

$CH_2$=CH—(X)$_p$—Rf—(X)$_p$—CH=$CH_2$ (1)

$CH_2$=CH—(X)$_p$—Q—Rf—Q—(X)$_p$—CH=$CH_2$ (2)

Herein X is independently —$CH_2$—, —$CH_2$O— or —Y—NR'—CO— wherein Y is —$CH_2$— or a group of the following structural formula (I):

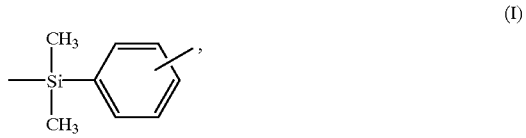

(the bond may be at o, m or p-position) and R' is hydrogen, methyl, phenyl or allyl. Q is a divalent hydrocarbon group having 1 to 15 carbon atoms, which may contain an ether bond. Rf' is a divalent perfluoroalkylene or perfluorooxyalkylene group, and p is independently equal to 0 or 1.

Of these, fluoropolyether compounds of the following general formula (3) are especially preferred.

The linear fluoropolyether compound of formula (3) desirably has a weight average molecular weight of about 400 to about 100,000, and especially about 1,000 to about 50,000.

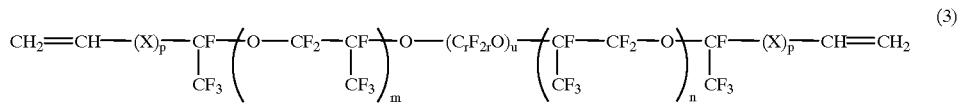
(3)

Herein X is as defined above, p is independently equal to 0 or 1, r is an integer of 2 to 6, u is an integer of 1 to 6, and m and n each are an integer of 0 to 200.

Illustrative examples of the fluoropolyether compound of formula (3) are given below. In the following formulae, m and n are as defined above.

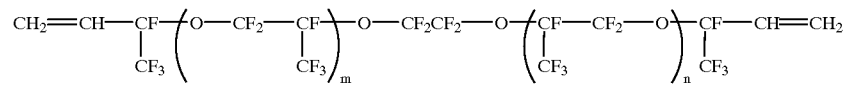

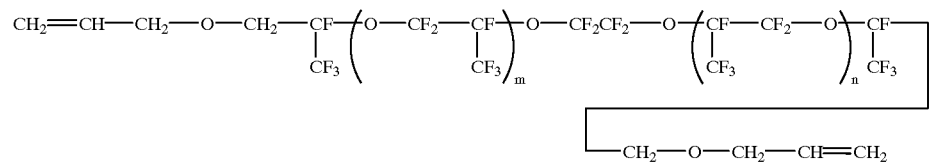

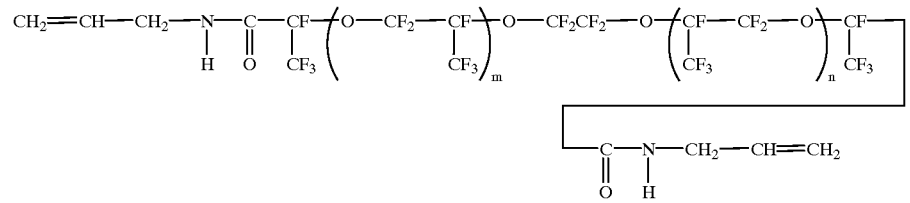

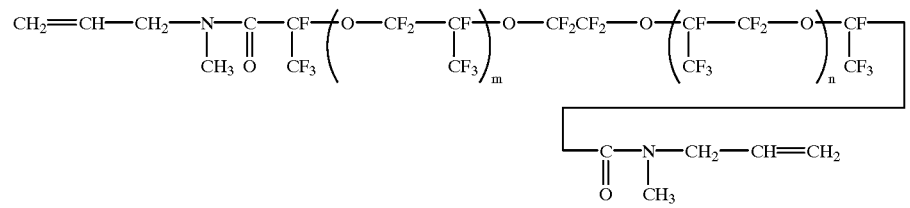

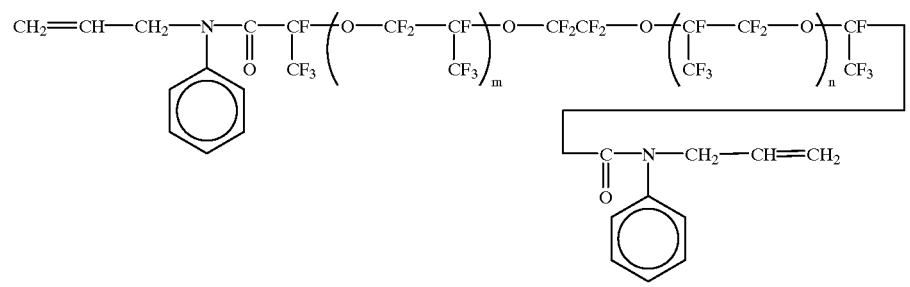

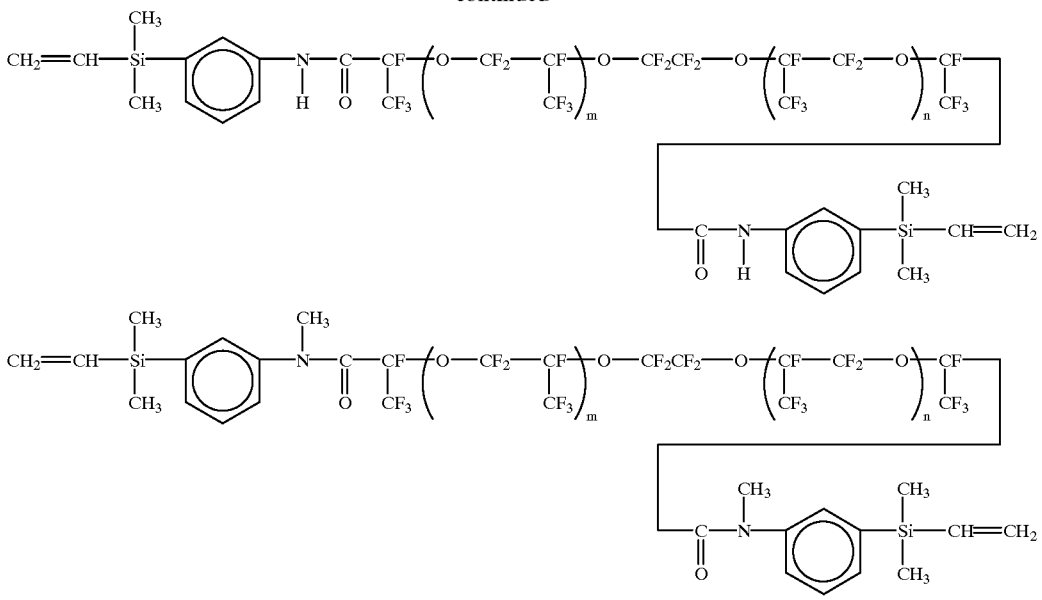

It is sometimes preferred to adjust the linear fluoropolyether compound to a desired weight average molecular weight for a particular application. In this case, a linear fluoropolyether compound is subjected to hydrosilylation reaction with an organosilicon compound having two SiH groups in a molecule by a conventional method under ordinary conditions to give a chain-lengthened product, which can be used as component (A).

The organosilicon compound (B) functions as a crosslinker and chain extender for component (A). Any organosilicon compound is useful as long as it has at least two hydrogen atoms each bound to a silicon atom in a molecule, all the silicon atom-bound hydrogen atoms forming H—Si($C_aH_{2a}$)Si structures wherein "a" is an integer of 1 to 3. Typical organosilicon compounds have the following general formula (4).

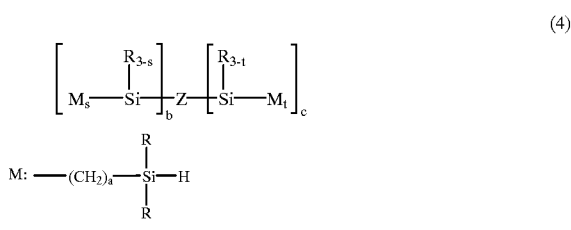

(4)

Herein R which may be the same or different is a monovalent hydrocarbon group having 1 to 20 carbon atoms. Z is hydrogen or a mono- or divalent group of the formula: —R, —M, —Q—Rf, —Q—, —Rf'— or —Q—Rf'—Q— wherein Q is a divalent hydrocarbon group having 1 to 15 carbon atoms, which may contain an ether bond, amide bond or carbonyl bond, Rf is a monovalent perfluoroalkyl or perfluorooxyalkyl group, and Rf' is a divalent perfluoroalkylene or perfluorooxyalkylene group. The subscripts "s" and "t" each are 1, 2 or 3, "b" and "c" each are 0 or 1, "b" and "c" are not 0 at the same time, and "a" is 1, 2 or 3.

Examples of the monovalent hydrocarbon group represented by R include alkyl groups such as methyl, ethyl and propyl and aryl groups such as phenyl, although the detail of R will be described later. Examples of the divalent hydrocarbon group represented by Q include alkylene groups such as methylene, ethylene, propylene, tetramethylene, and hexamethylene, arylene groups such as phenylene, and combinations of alkylene groups with arylene groups. These groups may contain ether, amide and carbonyl bonds.

Z is either a monovalent group (such as —H, —R, —M, or —Q—Rf) or a divalent group (such as —Q—, —Rf'— or —Q—Rf'—Q—), which depends on the values of b and c.

Illustrative examples of the organosilicon compound of formula (4) are given below. In the following formulae, Me is methyl.

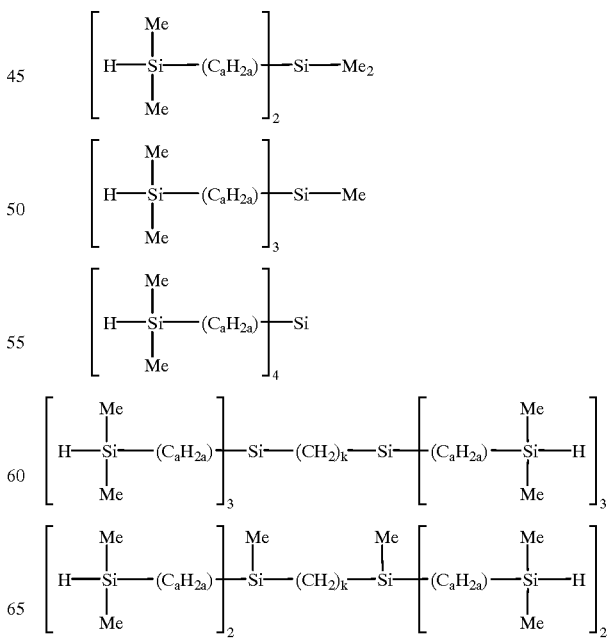

-continued

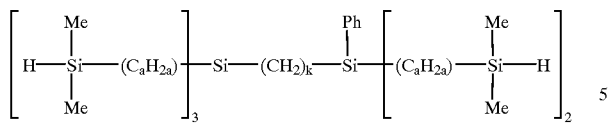

Note that "a" is an integer of 1 to 3 and k is an integer of 1 to 8.

With the compatibility with and dispersibility in component (A), and uniformity after curing taken into account, organosilicon compounds having at least one monovalent perfluoroalkyl group, monovalent perfluorooxyalkyl group, divalent perfluoroalkylene group or divalent perfluorooxyalkylene group are also useful.

The preferred perfluoroalkyl and perfluoroalkylene groups are those of 1 to about 20 carbon atoms, and the preferred perfluorooxyalkyl and perfluorooxyalkylene groups are those of 1 to about 500 carbon atoms, especially 4 to about 500 carbon atoms.

The perfluoroalkyl, perfluorooxyalkyl, perfluoroalkylene and perfluorooxyalkylene groups are exemplified by the groups of the following general formulae. monovalent perfluoroalkyl groups:

g is an integer of 1 to 20, preferably 2 to 10. divalent perfluoroalkylene groups:

g is an integer of 1 to 20, preferably 2 to 10. monovalent perfluorooxyalkyl groups:

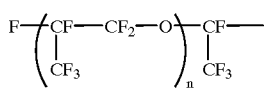

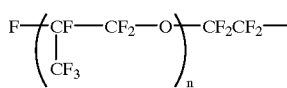

n is an integer of 1 to 5. divalent perfluorooxyalkylene groups:

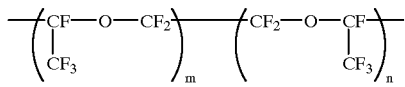

m+n is an integer of 2 to 100.

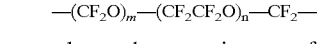

m and n each are an integer of 1 to 50.

These perfluoro(oxy)alkyl and perfluoro(oxy)alkylene groups each may be attached either directly to a silicon atom or to a silicon atom through a divalent linking group. The divalent linking group is an alkylene group, arylene group or a mixture thereof, which may further have an ether bond oxygen atom, amide bond or carbonyl bond. Such divalent linking groups of 2 to 12 carbon atoms are preferred. Illustrative examples thereof include

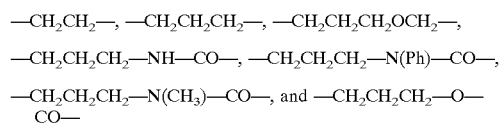

wherein Ph is phenyl.

In addition to the monovalent organic group containing a monovalent or divalent fluorinated substituent, that is, a perfluoroalkyl, perfluorooxyalkyl, perfluoroalkylene or perfluorooxyalkylene group, the organosilicon compound (B) may have a monovalent substituent R attached to a silicon atom. Exemplary monovalent substituents are substituted or unsubstituted hydrocarbon groups of 1 to 20 carbon atoms including alkyl groups such as methyl, ethyl, propyl, butyl, hexyl, cyclohexyl, octyl and decyl; alkenyl groups such as vinyl and allyl; aryl groups such as phenyl, tolyl, and naphthyl; aralkyl groups such as benzyl and phenylethyl; and substituted ones of these groups in which some of the hydrogen atoms are replaced by chlorine atoms, cyano groups or the like, such as chloromethyl, chloropropyl, and cyanoethyl.

The organosilicon compound (B) may be cyclic, chainlike or three-dimensional network. The number of silicon atoms per molecule of the organosilicon compound is not critical although it desirably has about 2 to about 60 silicon atoms, and especially about 3 to about 30 silicon atoms.

Illustrative examples of the organosilicon compound are given below. They may be used alone or in admixture of two or more. In the formulae, Me is methyl and Ph is phenyl.

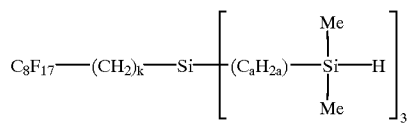

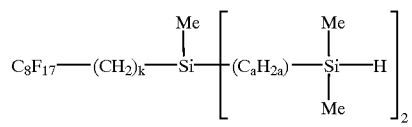

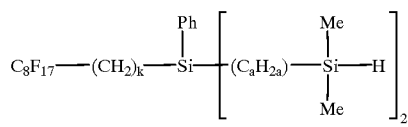

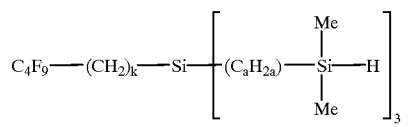

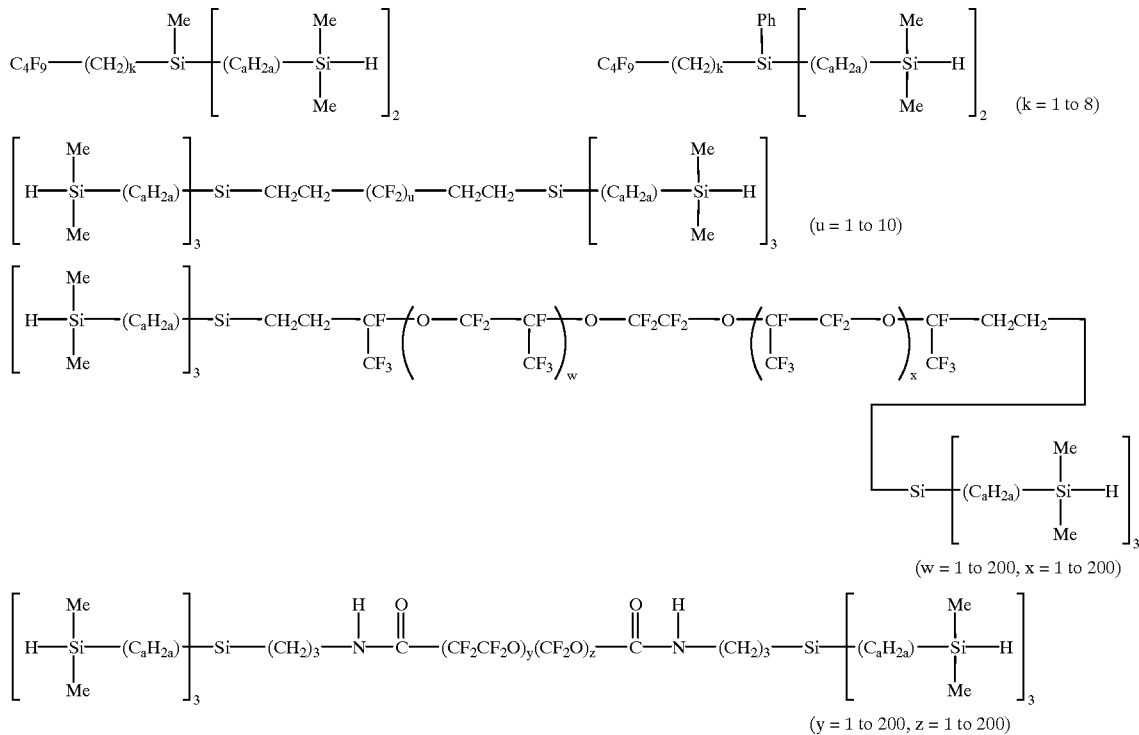

(k = 1 to 8)

(u = 1 to 10)

(w = 1 to 200, x = 1 to 200)

(y = 1 to 200, z = 1 to 200)

The organosilicon compound having hydrosilyl groups (B) is preferably blended in such an amount that 0.5 to 5 mol, and more preferably 1 to 2 mol of hydrosilyl groups (or SiH) groups may be present per mol of alkenyl groups (e.g., vinyl, allyl or cycloalkenyl) in component (A). Less amounts of component (B) may achieve an insufficient degree of crosslinking. Excessive amounts of component (B) may allow chain lengthening to become preferential, inviting short cure, foaming, and losses of heat resistance and compression set. The organosilicon compounds may be used alone or in admixture of two or more.

The hydrosilylation catalyst (C) is preferably selected from transition metals, for example, platinum group metals such as Pt, Rh and Pd, and compounds of transition metals. Most of these compounds are noble metal compounds which are expensive. Platinum compounds are thus used because they are readily available. Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, RhCl(PPh$_3$)$_3$, RhCl(CO)(PPh$_3$)$_2$, RhCl(C$_2$H$_4$)$_2$, Ru$_3$(CO)$_{12}$, IrCl(CO)(PPh$_3$)$_2$, and Pd(PPh$_3$)$_4$ wherein Ph denotes phenyl.

The amount of the catalyst used is not critical. A catalytic amount can achieve a desired curing rate. From the economical aspect and to obtain satisfactory cured products, the platinum group metal compound is preferably added in an amount of about 0.1 to about 1,000 parts, more preferably about 0.1 to about 500 parts by weight calculated as the platinum group metal per million parts by weight of the entire curable composition.

The antidegradant (D), which is an agent for inhibiting oxidative degradation, is selected from amine compounds, phenolic compounds, sulfur compounds, phosphorus compounds, waxes, and metal complexes thereof. The majority of these compounds are commercially available. Any of commercially available antidegradants is often used.

Examples of suitable amine antidegradants are shown below.

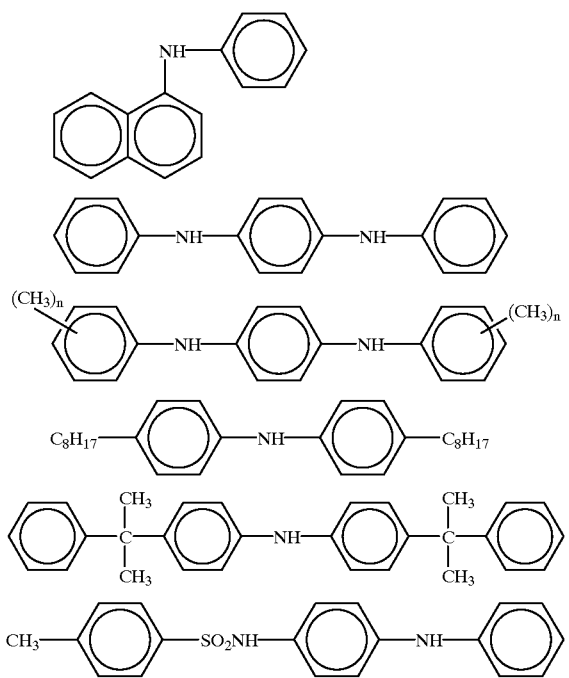

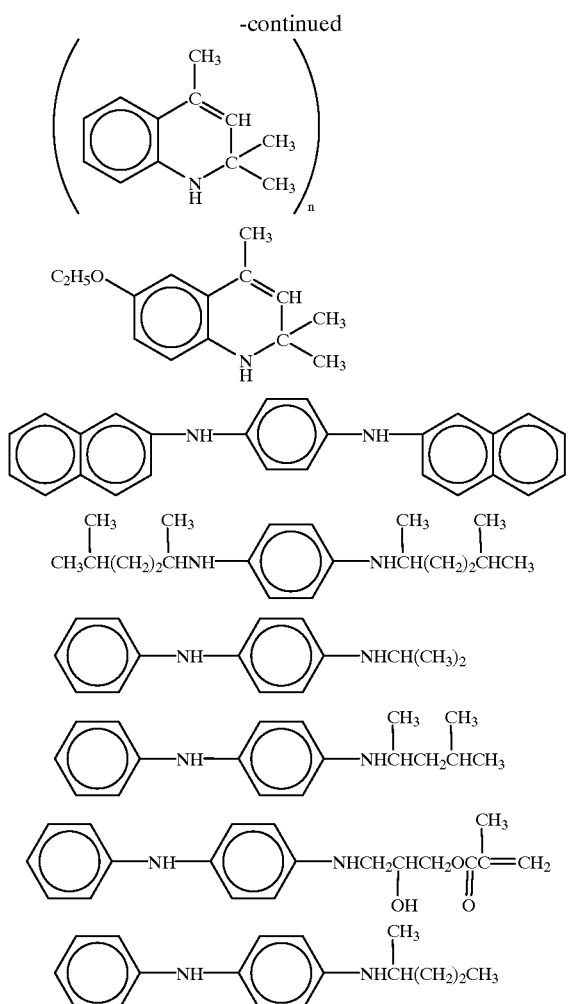
Examples of suitable phenolic antidegradants are shown below.
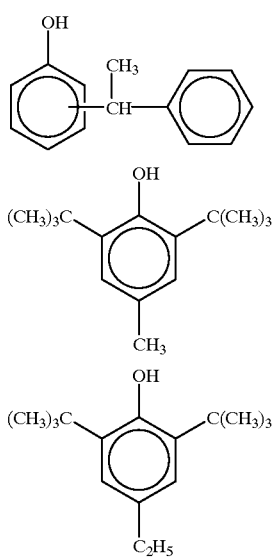
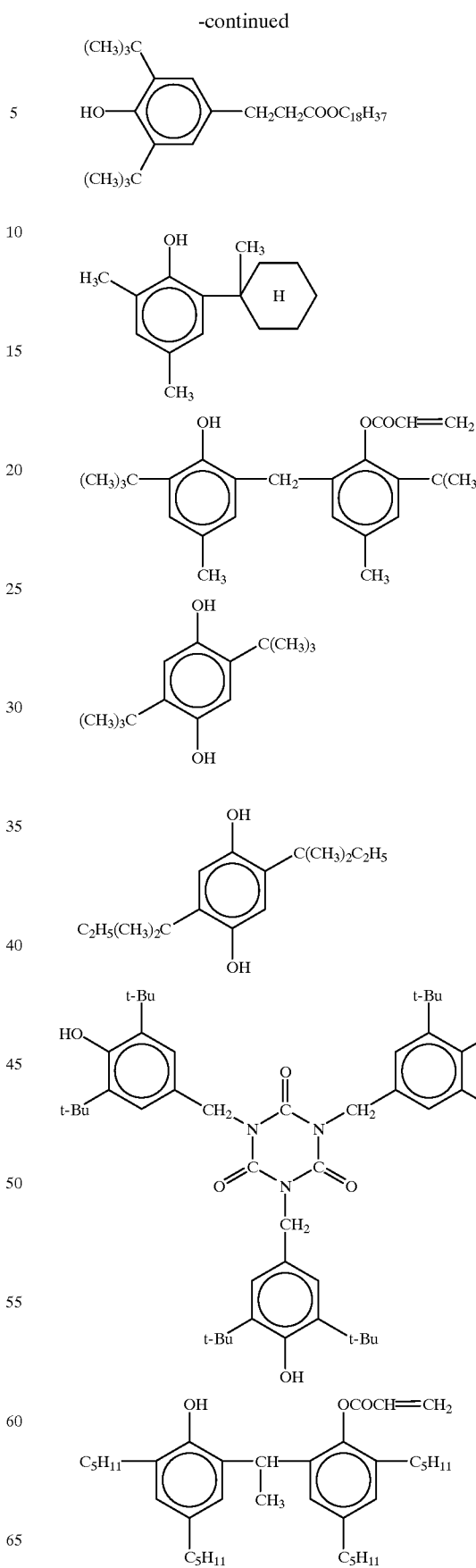

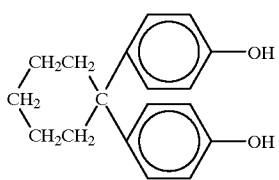
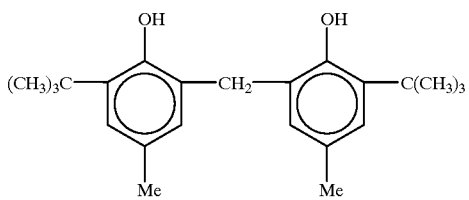
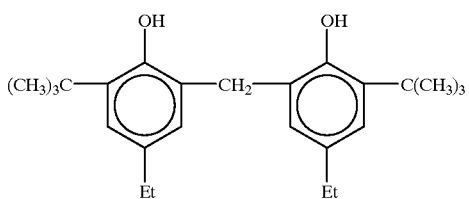
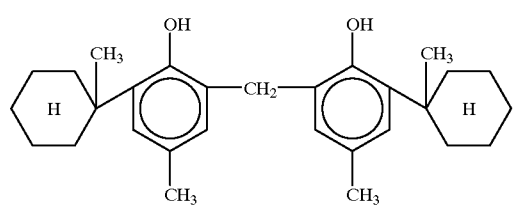
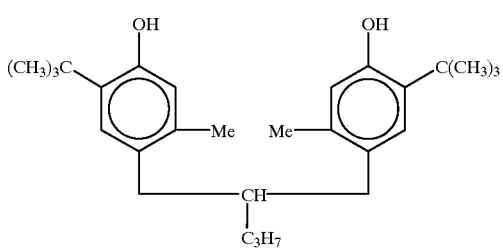
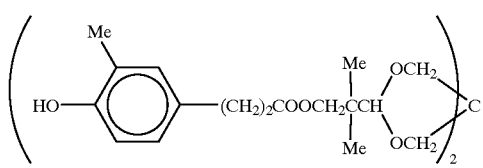
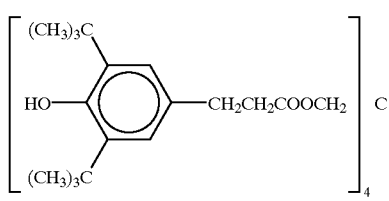
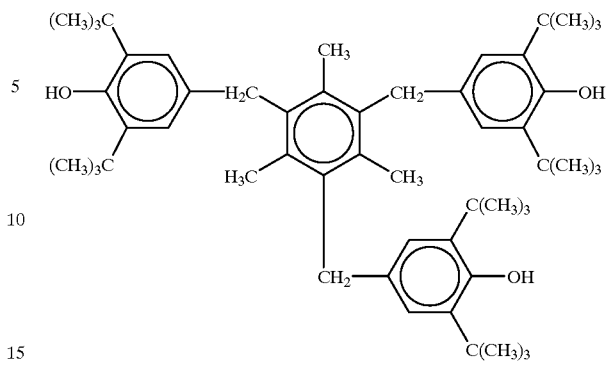
Examples of suitable sulfur, phosphorus, metal complex and combined antidegradants are shown below.
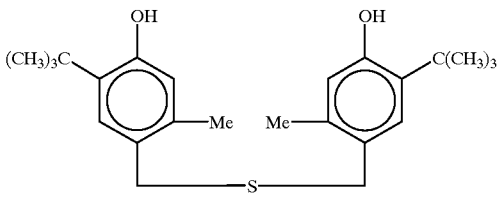
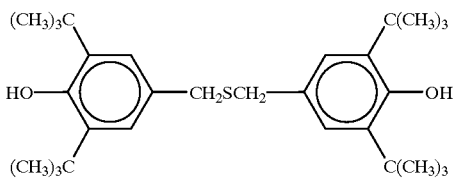
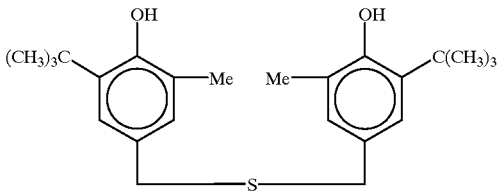
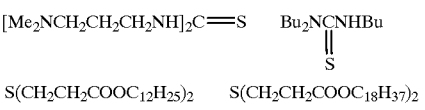
$S(CH_2CH_2COOC_{12}H_{25})_2 \quad S(CH_2CH_2COOC_{18}H_{37})_2$
$[C_{12}H_{25}SCH_2CH_2COOCH_2]_4C$
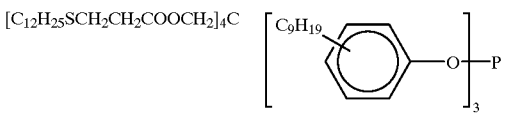
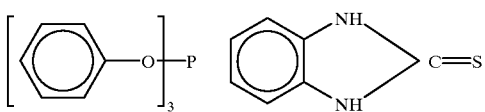
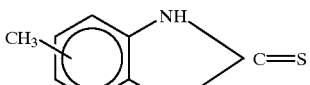
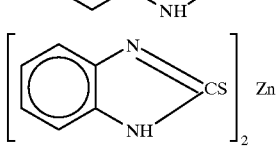

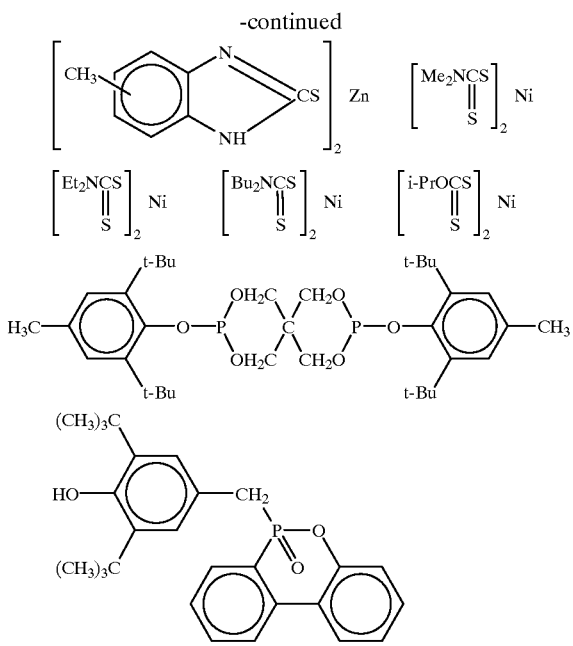

Of the foregoing antidegradants, amine and phenolic antidegradants are preferred because most sulfur and phosphorus-containing compounds can be a poison to the hydrosilylation catalyst. Among others, aromatic secondary amine compounds, that is, amine compounds in which substituents on the amino group are both aromatic groups are most effective for inhibiting oxidative degradation.

The antidegradant (D) is preferably added in an amount of 0.01 to 10% and more preferably 0.05 to 5% by weight based on the composition of the invention. Outside the range, less amounts of the antidegradant may be ineffective whereas excessive amounts can affect the physical properties of cured rubber, for example, lowering strength.

If desired, various additives may be added to the inventive curable composition for improving its practical usage. For instance, polysiloxanes containing $CH_2$=CH(R)SiO units wherein R is hydrogen or a substituted or unsubstituted monovalent hydrocarbon group (see JP-B 48-10947) and acetylene compounds (see U.S. Pat. No. 3,445,420 and JP-B 4-3774) are added for the purpose of controlling the curing rate of the curable compositions. Other useful additives are ionic compounds of heavy metals (see U.S. Pat. No. 3,532,649).

To the curable composition of the invention, fillers may be added for the purposes of reducing thermal shrinkage upon curing, reducing the coefficient of thermal expansion of the cured elastomer, improving thermal stability, weather resistance, chemical resistance, flame retardance or mechanical strength, and/or lowering the gas permeability. Exemplary additives include fumed silica, quartz flour, glass fibers, carbon, metal oxides such as iron oxide, titanium oxide and cerium oxide, and metal carbonates such as calcium carbonate and magnesium carbonate. If desired, suitable pigments and dyes are added.

The method of preparing the curable composition according to the invention is not critical. The composition may be prepared simply by mixing the above-described components. The composition may be formulated as two parts, one part consisting of components (A), (B) and (D) and the other part consisting of components (A) and (C), which are to be combined together on use. For the composition to cure, room temperature cure is possible depending on the type of functional group in component (A) and the type of catalyst (C) although a common, preferred practice is to heat the composition at about 100 to 200° C. for several minutes to several hours for curing.

On use, depending on its particular application and purpose, the curable composition may be dissolved in a suitable fluorochemical solvent, for example, 1,3-bistrifluoromethylbenzene or perfluorooctane in a desired concentration before it is applied.

The curable fluoropolyether rubber composition cures into parts which have good heat resistance, chemical resistance, solvent resistance, parting property, water repellency, oil repellency and weather resistance as well as improved resistance to acid, alkali and oxidative degradation. The composition is thus useful in a variety of molding applications, for example, as sealants for semiconductor manufacturing apparatus, O-rings, diaphragms and sealants for automobiles and aircraft, roll materials for copiers, and electrode constituent materials for secondary cells and fuel cells.

EXAMPLE

Examples of the invention are given below by way of illustration and not by way of limitation. The viscosity is a measurement at 25° C. All parts are by weight.

Comparative Example 1

To 100 parts of a polymer of formula (6) below (viscosity 8,500 cs, average molecular weight 22,000, and vinyl content 0.009 mol/100 g) was added 20 parts of dimethylsiloxy-treated fumed silica having a specific surface area of 200 m²/g. They were mixed, heat treated and milled on a three-roll mill. To the mixture were added 2.64 parts of a fluorinated organosilicon compound of formula (7) below, 0.2 part of a toluene solution of a catalyst in the form of chloroplatinic acid modified with $CH_2$=CHSiMe$_2$OSiMe$_2$CH=$CH_2$ (platinum concentration 1.0 wt %), and 0.4 part of a 50% toluene solution of ethynyl cyclohexanol. They were mixed to give composition I.

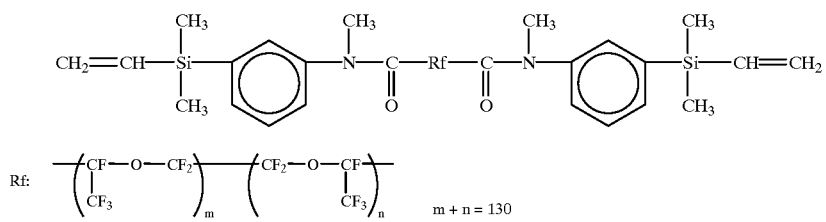

-continued

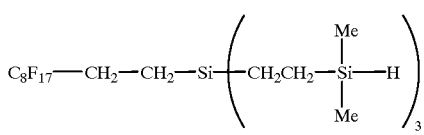

(7)

The composition was deaerated in vacuum, placed in a rectangular frame of 2 mm deep, deaerated again, and press cured at 100 kg/cm² and 150° C. for 10 minutes. From the cured sample, a specimen was cut out and measured for physical properties according to JIS K-6251 and 6253. The specimen was also examined for chemical resistance and heat resistance in air. The results are shown in Tables 1 and 2.

Comparative Example 2

Composition II was prepared as in Comparative Example 1 except that 2.49 parts of a fluorinated hydrogensiloxane of formula (8) shown below was used instead of the fluorinated organosilicon compound of formula (7).

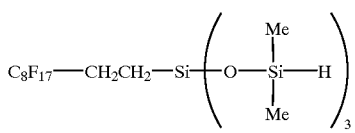

(8)

As in Comparative Example 1, a cured sheet was obtained from composition II. A specimen was cut therefrom and measured for physical properties according to JIS K-6251 and 6253. The specimen was also examined for chemical resistance and heat resistance in air. The results are shown in Tables 1 and 2.

Example 1

Composition III was prepared as in Comparative Example 1 except that 1.0 part of an antidegradant as shown below was added prior to the milling on the three-roll mill.

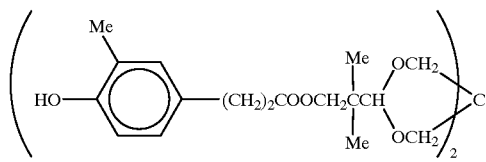

As in Comparative Example 1, a cured sheet was obtained from composition III. A specimen was cut therefrom and measured for physical properties according to JIS K-6251 and 6253. The specimen was also examined for chemical resistance and heat resistance in air. The results are shown in Tables 1 and 2.

Example 2

Composition IV was prepared as in Comparative Example 1 except that 1.0 part of an antidegradant as shown below was added prior to the milling on the three-roll mill.

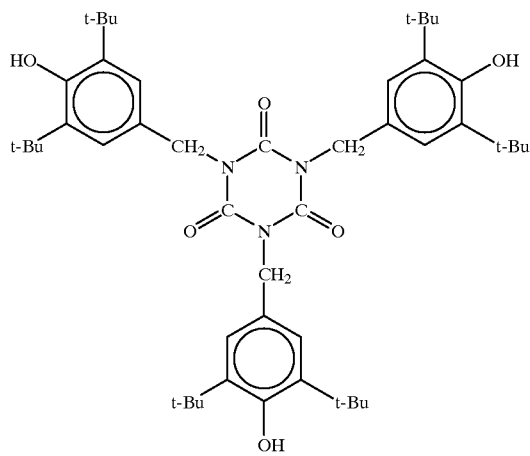

As in Comparative Example 1, a cured sheet was obtained from composition IV. A specimen was cut therefrom and measured for physical properties according to JIS K-6251 and 6253. The specimen was also examined for chemical resistance and heat resistance in air. The results are shown in Tables 1 and 2.

Example 3

Composition V was prepared as in Comparative Example 1 except that 1.0 part of an antidegradant shown below was added prior to the milling on the three-roll mill.

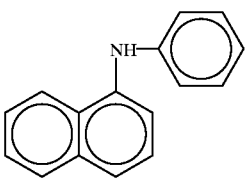

As in Comparative Example 1, a cured sheet was obtained from composition V. A specimen was cut therefrom and measured for physical properties according to JIS K-6251 and 6253. The specimen was also examined for chemical resistance and heat resistance in air. The results are shown in Tables 1 and 2.

Example 4

Composition VI was prepared as in Comparative Example 1 except that 1.0 part of an antidegradant shown below was added prior to the milling on the three-roll mill.

As in Comparative Example 1, a cured sheet was obtained from composition VI. A specimen was cut therefrom and measured for physical properties according to JIS K-6251 and 6253. The specimen was also examined for chemical resistance and heat resistance in air. The results are shown in Tables 1 and 2.

TABLE 1

Chemical resistance (change of rubber hardness)

| Chemcals | Comparative Example | | Example | | | |
|---|---|---|---|---|---|---|
| | 1 | 2 | 1 | 2 | 3 | 4 |
| Initial | 40 | 41 | 40 | 40 | 41 | 41 |
| Conc. hydrochloric acid | 42(+2) | 48(+7) | 42(+2) | 42(+2) | 44(+3) | 44(+3) |
| Conc. sulfuric acid | 39(−1) | 40(−1) | 40(0) | 40(0) | 41(0) | 42(+1) |
| Conc. hydrofluoric acid | 39(−1) | 30(−11) | 39(−1) | 38(−2) | 41(0) | 41(0) |
| Trifluoroacetic acid | 38(−2) | decomposed | 38(−2) | 38(−2) | 40(−1) | 41(0) |
| 40% KOH solution | 41(+1) | 41(+1) | 41(+1) | 41(+1) | 42(+1) | 41(0) |

Degrading conditions are immersion in the designated chemical at 20° C. for 3 days. Figures in parentheses denote point increments or decrements from the initial.

Comparative Example 2 was less resistant to chemicals because the crosslinking agent had a siloxane structure. All other examples were fully resistant to chemicals.

TABLE 2

Heat resistance in air

| | | Comparative Example | | Example | | | |
|---|---|---|---|---|---|---|---|
| | | 1 | 2 | 1 | 2 | 3 | 4 |
| Hardness | Initial | 40 | 41 | 40 | 40 | 41 | 41 |
| | 200° C./ 7 days | 38 (−2) | 40 (−1) | 39 (−1) | 39 (−1) | 43 (+2) | 43 (+2) |
| Elongation (%) | Initial | 540 | 620 | 490 | 490 | 530 | 520 |
| | 200° C./ 7 days | 450 (−17) | 580 (−6) | 440 (−10) | 430 (−12) | 500 (−6) | 480 (−8) |
| Tensile strength (MPa) | Initial | 10.7 | 11.8 | 9.7 | 9.8 | 10.5 | 10.4 |
| | 200° C./ 7 days | 6.7 (−37) | 11.0 (−7) | 8.2 (−15) | 8.0 (−18) | 9.8 (−7) | 9.4 (−10) |

Figures in parentheses denote point increments or decrements from the initial for the hardness, and percent increments or decrements from the initial for the elongation and tensile strength.

Examples 1 to 4 corresponded to Comparative Example 1 to which the antidegradants were added. As seen from Table 2, Comparative Example 1 experienced substantial losses of rubber physical properties, especially tensile strength, whereas those compositions having antidegradants added experienced only some losses of rubber physical properties. In particular, Examples 3 and 4 in which aromatic secondary amine compounds were used as the antidegradant experienced a less reduction of rubber physical properties. Comparative Example 2 in which the crosslinking agent had a siloxane structure was more resistant to oxidative degradation than Comparative Example 1.

It is evident from Tables 1 and 2 that the compositions within the scope of the invention are improved in both chemical resistance and oxidative degradation resistance.

Japanese Patent Application No. 2000-208633 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether rubber composition comprising:

(A) a linear fluoropolyether compound containing at least two alkenyl groups in a molecule and having a perfluoroalkyl ether structure in its backbone, (B) an organosilicon compound having at least two hydrogen atoms each bound to a silicon atom in a molecule, all the silicon atom-bound hydrogen atoms forming H—Si($C_aH_{2a}$)Si structures wherein "a" is an integer of 1 to 3, (C) a hydrosilylation catalyst, and (D) an antidegradant, which is an amine or phenolic compound.

2. The composition of claim 1 wherein the linear fluoropolyether compound (A) has the following general formula (1) or (2):

$$CH_2=CH-(X)_p-Rf-(X)_p-CH=CH_2 \quad (1)$$

$$CH_2=CH-(X)_p-Q-Rf-Q-(X)_p-CH=CH_2 \quad (2)$$

wherein X is independently —CH$_2$—, —CH$_2$O— or —Y—NR'—CO—
wherein Y is —CH$_2$— or a group of the following structural formula (I):

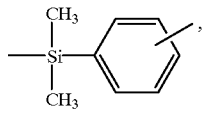
(I)

and R' is hydrogen, methyl, phenyl or allyl,

Q is a divalent hydrocarbon group having 1 to 15 carbon atoms, which may contain an ether bond, Rf' is a divalent perfluoroalkylene or perfluorooxyalkylene group, and p is independently equal to 0 or 1.

3. The composition of claim 1 wherein the linear fluoropolyether compound (A) has the following general formula (3):

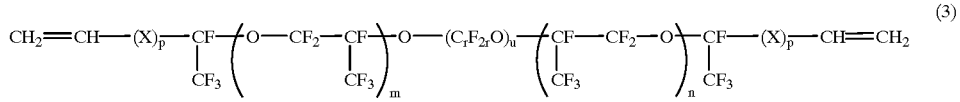
(3)

wherein X is independently —CH$_2$—, —CH$_2$O— or —Y—NR'—CO—
wherein Y is —CH$_2$— or a group of the following structural formula:

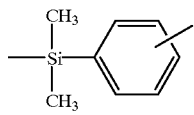
(I)

and R' is hydrogen, methyl, phenyl or allyl, p is independently equal to 0 or 1, r is an integer of 2 to 6, u is an integer of 1 to 6, and m and n each are an integer of 0 to 200.

4. The composition of claim 1 wherein the organosilicon compound (B) has the following general formula (4):

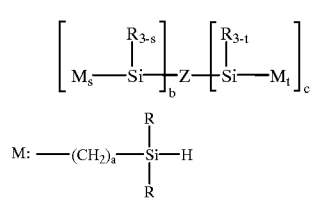
(4)

wherein R which may be the same or different is a monovalent hydrocarbon group having 1 to 20 carbon atoms, Z is hydrogen or a mono- or divalent group of the formula: —R, —M, —Q—Rf, —Q—, —Rf'— or —Q—Rf'—Q— wherein Q is a divalent hydrocarbon group having 1 to 15 carbon atoms, which may contain an ether bond, amide bond or carbonyl bond, Rf is a monovalent perfluoroalkyl or perfluorooxyalkyl group, and Rf' is a divalent perfluoroalkylene or perfluorooxyalkylene group, s and t each are 1, 2 or 3, b and c each are 0 or 1, b and c are not 0 at the same time, and "a" is 1, 2 or 3.

5. The composition of claim 1 wherein the antidegradant (D) is an amine compound.

6. The composition of claim 1 wherein the antidegradant (D) is an aromatic secondary amine compound.

7. The composition of claim 1 wherein the linear fluoropolyether compound (A) has:

a perfluoroalkyl ether structure containing a plurality of recurring units of the formula: —C$_d$F$_{2d}$O—wherein d is independently on each occurrence an integer of 1 to 6 and an overall structure of the following general formula (5):

$$(C_dF_{2d}O)_q \qquad (5)$$

wherein q is an integer of 1 to 500, and at least two alkenyl groups of 2 to 8 carbon atoms having a CH$_2$=CH— structure at the end.

8. The composition of claim 3 wherein the linear fluoropolyether compound of formula (3) has a weight average molecular weight of about 400 to about 100,000.

9. The composition of claim 1 wherein the organosilicon compound (B) contains at least one monovalent perfluoroalkyl group, monovalent perfluorooxyalkyl group, divalent perfluoroalkylene group or divalent perfluorooxyalkylene group.

10. The composition of claim 1 wherein the organosilicon compound, (B), is provided in the composition in an amount such that 0.5 to 5 mol of silicon atom-bound hydrogen atoms are present per mol of alkenyl groups in component (A).

11. The composition of claim 1 wherein the hydrosilylation catalyst is a platinum group metal catalyst.

12. The composition of claim 1, wherein the antidegradant, (D), is a phenolic compound.

13. The composition of claim 1, wherein the antidegradant, (D), is an aromatic secondary amine compound with two aromatic group substituents on an amino group.

14. The composition of claim 1, wherein the antidegradant (D) is provided in an amount of 0.01 to 10% by weight based on the entire composition.

15. The composition of claim 1, wherein the antidegradant (D) is provided in an amount 0.05 to 5% by weight based on the entire composition.

* * * * *